United States Patent [19]
Mainord

[11] 3,936,659
[45] Feb. 3, 1976

[54] ELECTRICALLY HEATED OVEN FOR HIGH TEMPERATURE CLEANING

[76] Inventor: Kenneth R. Mainord, 522 N. First, Apt. 105, Longview, Tex. 75601

[22] Filed: May 31, 1974

[21] Appl. No.: 474,916

[52] U.S. Cl.............. 219/413; 23/288 J; 126/90 A; 134/19; 219/393; 219/400
[51] Int. Cl.².......................................... H05B 1/02
[58] Field of Search .......... 219/279, 393, 396, 397, 219/400, 412, 413; 126/21 A, 90 A; 134/2, 19, 20; 236/15 E; 237/2 A; 23/288 J; 431/18

[56] References Cited
UNITED STATES PATENTS

| | | | |
|---|---|---|---|
| 3,374,117 | 3/1968 | Savage | 134/2 |
| 3,423,568 | 1/1969 | Meckley et al. | 219/279 |
| 3,428,435 | 2/1969 | Hurko et al. | 219/397 X |
| 3,610,815 | 10/1971 | Wainer | 134/2 |
| 3,610,883 | 10/1971 | Holtkamp | 219/413 |
| 3,668,371 | 6/1972 | Fry et al. | 219/413 |
| 3,806,700 | 4/1974 | Gilliom | 219/413 |

Primary Examiner—Volodymyr Y. Mayewsky
Attorney, Agent, or Firm—Richards, Harris and Medlock

[57] ABSTRACT

An electrically heated high temperature oven for removing organic contaminants from glassware and metals, wherein preset timers and a temperature controller direct a three-stage pyrolysis-oxidation process continually monitored by combustion detection systems and applied within a high temperature oven incorporating additional safety devices for a protection of personnel and equipment.

8 Claims, 1 Drawing Figure

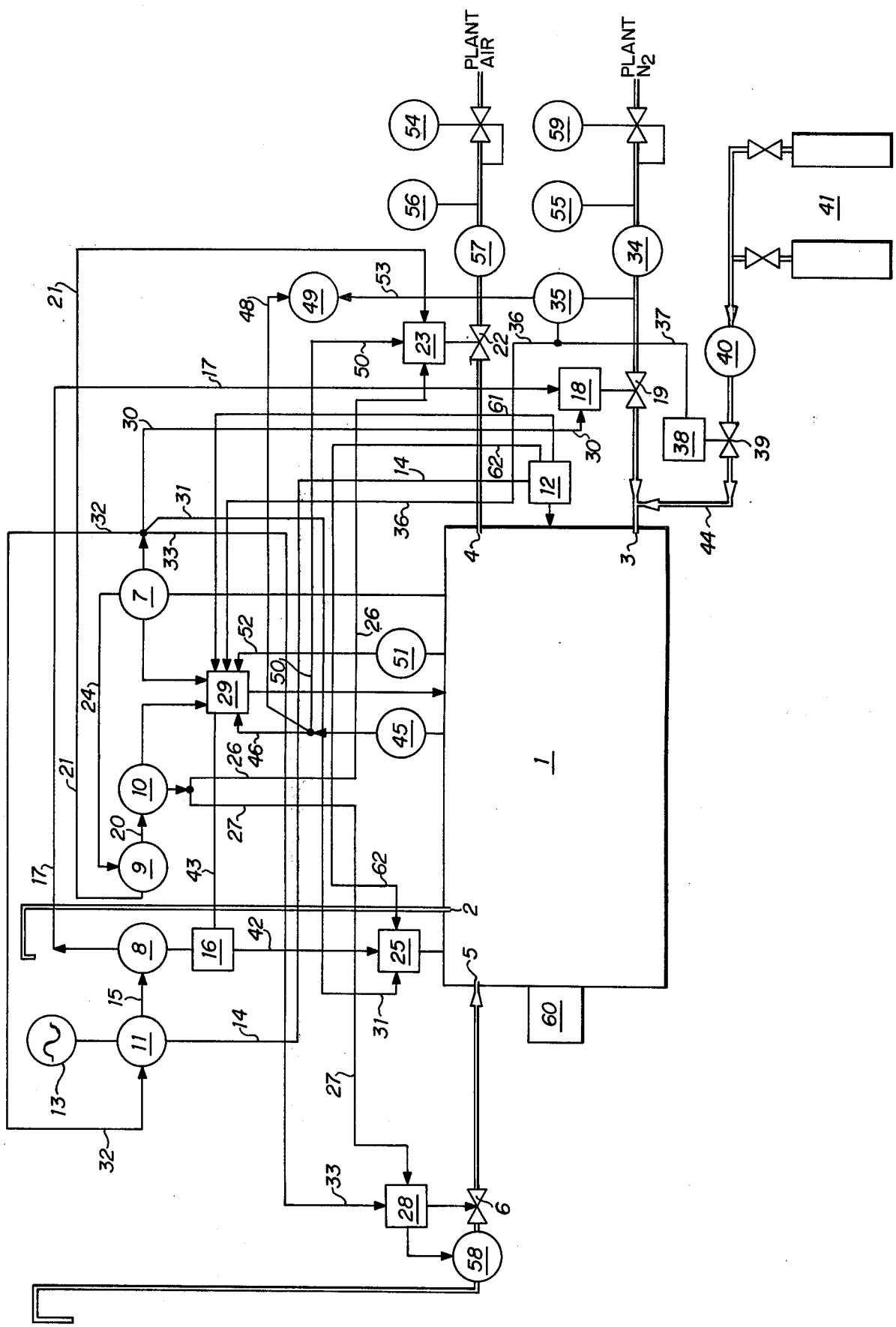

ELECTRICALLY HEATED OVEN FOR HIGH TEMPERATURE CLEANING

FIELD OF THE INVENTION

This invention relates to the use of high temperature cleaning ovens, and more particularly to an automated method of employing a pyrolysis-oxidation process in a high temperature oven.

PRIOR ART

With the rapid growth of polymer chemistry and technology, the problems of cleaning metal parts and glassware have grown especially severe.

When confronted with a piece of laboratory apparatus contaminated with difficult-to-remove organic residue, the chemist or technician has resorted to what have become standard laboratory procedures. He may attempt to wash with water and detergents or burn the organic residue with a flame. In the alternative, he may attempt to dissolve the residue through the use of cold organic solvents, hot organic solvents, oxidizing solvents such as hot chromic acid, or concentrated solutions of alkali and methanol.

Conventional solvents are unsatisfactory in removing plastics and other polymers from laboratory glassware, and particularly unsatisfactory when the organic contaminant is a relatively inert polymer such as polyolefin. Further, the handling of hot flammable organic solvents or oxidizing solvent baths may result in serious personal injury. And finally, the burning of the organic residue with a flame may warp the laboratory objects or leave a residue of soot, requiring an additional cleansing.

Not only are these procedures often unsafe, but they frequently accrue a labor cost which exceeds the replacement cost of the laboratory item to be cleaned. A more cost effective means of removing difficult organic contaminants is a high temperature oven employing a pyrolysis-oxidation process in an automatic cleaning cycle.

In the prior art, U.S. Pat. No. 3,615,815 issued to Wainer on Oct. 26, 1971, and U.S. Pat. No. 3,374,117 issued to Savage on Mar. 19, 1968, disclose a broad principle of first reducing a contaminant to a carbonaceous form and then removing it by oxidation. U.S. Pat. No. 3,423,568 issued to Meckley et al. on Jan. 21, 1969, teaches the use of an electrical heating system to reduce unwanted contaminants to a carbonaceous form. Further, high temperature ovens are available commercially which apply heat in a vacuum or in a nitrogen atmosphere to pyrolyze various contaminants or residues. The generation of combustible gases and the danger of heat damage to the contaminated articles, however, have hindered the commercial success which could have otherwise been acquired with a pyrolysis-oxidation process carried out in a high temperature oven.

SUMMARY OF THE INVENTION

The present invention comprises an automatic, high temperature cleaning system employing a pyrolysis-oxidation process in a high temperature oven embodying safety devices for the protection of personnel and equipment. More particularly, a timer controlled three-stage cleaning process is carried out sequentially in a high temperature oven to remove a wide range of organic contaminants including polymers, resins, and tars. The first stage involves a purging of the oven chamber with an inert gas such as nitrogen to remove all air. During the second stage, thermal pyrolysis at temperatures from about 800° Farenheit to 1000° Farenheit occurs under the inert gas purge to distill away the bulk of the organic contaminants. Only carbon deposits or ash are left on the glass or metal parts. The third stage involves removing the carbon deposits by oxidation in a nitrogen atmosphere, such atmosphere having an oxygen content below the minimum required to produce a flammable mixture with the organic vapors.

The three-stage process is continually monitored by automatic detection systems. If a combustible mixture is present, an automatic combustion detection system terminates air flow, turns off the oven heater, and sounds an alarm. If the inert gas ceases to flow or drops below a preset level during the cleaning process, a loss of inert gas detection system shuts down the oven heaters, sounds an alarm and purges the oven chamber with inert gas from an auxiliary source.

Additional safety devices include a key interlock system which protects personnel from injury resulting from an accidental opening of the oven door during the cleaning process, an oven-temperature switch which automatically turns the oven heaters off when the oven overheats, and an explosion relief panel which, in the event combustible gases ignite, vents the concussion to protect personnel and equipment.

In accordance with the present invention, there is provided an automatic method and system for employing a pyrolysis-oxidation process in a high temperature cleaning oven. More particularly, a timer controlled three-stage cleaning process is carried out sequentially in a high temperature oven, which is continually monitored by automatic combustion detection systems and embodies a key interlocking system, an over-temperature switch, and an explosion relief panel to provide additional protection for personnel and equipment.

DESCRIPTION OF THE DRAWINGS

For a more complete understanding of the present invention and for further objects and advantages thereof, reference may now be had to the following description taken in conjunction with the accompanying drawing in which the FIGURE is a schematic diagram of the electro-mechanical system utilized in the invention.

DESCRIPTION OF A PREFERRED EMBODIMENT

The system illustrated in the FIGURE includes a high temperature, electrically heated pyrolysis oven 1 capable of operating continuously at up to 1000°F. under inert gas and air purges without significant leakage. In the disclosed embodiment, the oven is adapted for 220 volt, single or three phase operation. It is to be understood that the invention encompasses adaptations to any commercially available power source. The oven has both a nitrogen gas port 3 and an air port 4 which are opened and closed by electrically operated valves permitting a flow of gas sufficient to purge the oven chamber. As a rule of thumb, the flow rate of inert gas in cubic feet per hour should be approximately 10 times the volume of the chamber to be purged.

In addition to air port 4, which operates off of compressed air, an air cooling system including port 5, a large diameter valve 6, and a forced air blower 58 is provided. The air cooling system reduces the time required for the oven to cool to room temperature from the high temperatures acquired during a cleaning process. Throughout the cleaning process nitrogen, air, pyrolysis gases and oxidation gases are vented from the oven chamber through an exhaust pipe 2 to be flared or further processed for release to the atmosphere.

When the oven is loaded with articles to be cleaned, the oven door is closed. The door cannot be opened once the cleaning cycle has begun unless a key is inserted in an electrical master switch and the oven is deenergized.

The cleaning cycle is begun by pushing a start button 11. Button 11 is connected directly to a power source 13, a key interlock 12 by way of line 14, and a timer 8 by way of line 15.

Timer 8 is set for a period of time to purge the oven with nitrogen. The timer is connected to a controller 16 and by way of line 17 to a solenoid 18. At the beginning of the purge cycle, solenoid 18 is energized to open a nitrogen valve 19, which closes only after a temperature indicator controller 7 shuts the entire system down. When the purge time has ended, timer 8 initiates controller 16 which starts a circulating fan and applies power to the oven heaters.

Controller 16 is connected by way of line 42 to a circulating fan 25, and by way of line 43 to a heater control unit 29. Fan 25, located in the plenum chamber of the oven, insures even temperatures through mechanical convection of the oven atmosphere. The fan is entirely within the insulated walls of the oven and is connected by means of an extended shaft to an external high-speed, ball-bearing motor.

When the oven reaches an operating temperature of 900°F., temperature indicator controller 7 initiates a pyrolysis timer 9 by way of line 24. Preferably, controller 7 is a two-switch, adjustable differential temperature controller such as that produced by The Partlow Corporation of New Hartford, New York, and disclosed in their 1973 sales bulletin 262-1 for model LFBSS. Controller 7 has both a high and a low set point, and operates in an adjustable range from 100° to 1000°F. The controller initiates the pyrolysis cycle when the oven temperature reaches the high set point. Further, when the oven cools to the lower set point, the controller shuts down the entire system by transmitting a signal along line 30 to solenoid 18 and along line 33 to a solenoid 28 to close nitrogen valve 19 and a cooling air valve 6, respectively. In addition, controller 7 regulates the oven temperature during the pyrolysis cycle by controlling the duty cycle of heater control unit 29.

Timer 9, automatically initiated by controller 7 when its high set point is reached, is manually set for a period of thermal pyrolysis to distill away contaminants. The timer is connected to a solenoid 23 by way of line 21, and to a timer 10 by way of line 20. At the end of the pyrolysis cycle, timer 9 initiates timer 10 and energizes solenoid 23 to open an air valve 22.

Timer 10 controls a period of oxidation during which carbon deposits are removed in a nitrogen mixture having, in the preferred embodiment, less than eight percent oxygen. The timer is connected to control unit 29, to solenoid 23 by way of line 26, and to solenoid 28 by way of line 27. At the end of the oxidation cycle, solenoid 23 is energized to close air valve 22, and solenoid 28 is energized to open air valve 6 and to start an air blower 58. The oven heaters are deenergized while fan 25 continues to operate.

When the oven cools to the lower set point of controller 7, valves 19 and 6 are closed. Controller 7 also shuts down fan 25 by way of line 31, and resets start button 11 by way of line 32.

Consequently, the timers recycle, the entire oven is deenergized, and interlock 12 unlocks the oven door. An operator may then open the oven door by inserting a key in the master switch of interlock 12.

In summary, the basic operating procedure involves loading the oven 1 with glassware or metal parts to be cleaned, engaging a normally closed master switch to close the oven door, setting the timers, and depressing the start button 11 to begin the cleaning cycle. No further intervention by the operator is required until time for unloading.

When start button 11 is depressed to initiate the cleaning cycle, key interlock 12 activates a solenoid shaft which locks the oven door. Timer 8 is then activated to purge the oven chamber with nitrogen at room temperature. When the nitrogen purge cycle ends, fan 25 and the oven heaters are energized to achieve an operating temperature of around 900° Farenheit. As the oven heats up, pyrolysis begins to occur under the nitrogen purge, and the pyrolysis gases are vented through pipe 2. When the oven reaches the operating temperature, timer 9 is activated for continued pyrolysis for the preset time. When the pyrolysis cycle ends, air valve 22 is opened and timer 10 is initialized to begin the oxidation cycle. The oven then operates at 900° Farenheit under an air-nitrogen purge for the preset time. At the end of the oxidation cycle, valve 22 and the oven heaters are turned off. A forced air cooling system comprising a large-orifice solenoid valve 6 is opened and blower 58 is energized. When the lower set point, approximately room temperature, on controller 7 is reached, the timers are recycled and the entire oven is deenergized. Key interlock 12 then unlocks the door which may be opened by inserting a key in a master switch. An operator may subsequently remove the glassware or metal parts that were cleaned.

As a practical matter, a tray located in the bottom of the oven chamber to catch molten residue has been found necessary to protect the oven door sealing gasket. Without the tray, the residue may flow onto the door gasket and solidify when the oven cools. When the door is opened, the gasket may be damaged.

When organic contaminants are decomposed at high temperatures in an inert atmosphere, the gaseous products are normally combustible and will burn or explode in an air atmosphere. Therefore, sufficient precautions must be taken to prevent the accidental introduction of air into the oven during the pyrolysis stage. A detailed description of the safety features designed into the present invention to prevent harm to personnel and equipment follows.

Key interlock 12, which includes a key operated master switch and an electrically operated solenoid shaft, is designed to prevent accidental opening of the oven door once the cleaning cycle has begun. A normally closed, key-operated electricial master switch secures the oven door when it is closed. When power is applied to oven 1, a solenoid shaft is activated which physically locks the door. Thus the door cannot be opened again until a key is inserted into the master switch and the oven is deenergized.

Should an unexpected contingency arise, the oven door may be opened during the cleaning cycle only by personnel with keys. When a key is inserted, the master switch independently deenergizes the solenoid lock, and turns off the oven heaters and fan by way of lines 61 and 62, respectively.

A loss of inert gas supply detection system provides an auxiliary purge means in the event a primary source fails. A pressure switch 35 compares the flow of nitrogen to oven port 3 with a preset level. In the event the nitrogen ceases to flow because of a malfunction, switch 35 is activated to deenergize the heaters by way of line 36, to energize solenoid 38 by way of line 37, and sound alarm 49 by way of line 53. Solenoid 38 opens nitrogen valve 39 to admit nitrogen from bottles 41 through regulator 40. Regulator 40 maintains a set pressure along line 44 to oven port 3. The oven fan continues to operate to prevent possible damage to the oven or its contents.

The total time required for pyrolysis of the organic material depends directly on the temperature of pyrolysis, the amount of organic material, and the nature of the organic material. For example, a load of glassware which is only lightly contaminated might take only a few minutes to pyrolyze to gaseous products. Another load which is very heavily contaminated might take several hours. There is always the possibility that timer 9 could be set too low for the particular load involved, thus allowing air to be introduced while combustible gases are still present in the oven. A combustible gas detector 45, having a high temperature gas detector probe within the oven chamber, and an associated mixture indicator external to the oven, serves as a backup safety system to prevent an explosion. The combustible gas detector and temperature probe combination used in the illustrative embodiment includes a J-W Combustible Gas Alarm System of the CD800P series with high temperature probe No. 23-7338, both produced by Bacharach Instrument Company of Pittsburgh, Pa. If a combustible gas-air mixture exceeds a preset indication on the gas detector meter, the heaters are deactivated by means of a signal on line 46, and air valve 22 is closed by means of a signal along line 50. In addition, alarm 49 is energized by means of a signal along line 48. The oven continues to be purged with nitrogen, and the cleaning cycle ceases until an operator reinitiates the system.

Alternatively, the detector can be wired to automatically reset. In that case, the detector automatically controls both the on-off cycling of the heaters during the nitrogen purge stage, and the on-off cycling of air valve 22 during the oxidation stage to prevent the formation of a combustible atmosphere.

For additional safety during the cleaning process, a second and concurrent method prevents the accumulation of explosive mixtures in the oven chamber. The nitrogen valve 19 is left open at the end of the pyrolysis cycle and throughout the oxidation cycle. When air is introduced through port 4 into the nitrogen atmosphere for the oxidation of the organic residue, a pressure regulator 54 automatically maintains air pressure to valve 22 at a preset level. In like manner, a regulator 59 maintains the nitrogen pressure to valve 19 at a preset level. Thus, a nitrogen-oxygen mixture with less than eight percent oxygen may be maintained in the oven chamber during the oxidation cycle to prevent a flammable mixture of combustible gases.

A pressure gauge 56 with a flowmeter 57, and a pressure gauge 55 with a flowmeter 57, and a pressure gauge 55 with a flowmeter 34 are used to set regulators 54 and 59, respectively. These pressure gauge and flowmeter combinations may also be used to perform static safety checks on the air and nitrogen lines.

A temperature sensitive safety device permits the cleaning of glassware by a pyrolysis-oxidation method without overheating or exposing the glassware to excessively sharp temperature changes. An over-temperature switch 51 is a high limit thermostat including a manual reset controller and an auxiliary main power relay. The controller has two switches, one for elevated temperatures and another which is activated by a sensing system failure. When the oven overheats or the sensing system fails, a signal is issued along line 52 to shut the oven heaters down. Since most runaway temperature conditions are a result of not only a malfunction of the temperature controller, but also a mechanical sticking of the heater control relay, the auxiliary power relay (not shown) is activated to deenergize oven 1 when the heaters are energized and then deenergized by switch 51. After a high temperature shut down, the cleaning process may be continued by manually starting the pyrolysis cycle.

In the event an explosion occurs in the oven chamber despite the safety features incorporated into the cleaning system, protection to personnel and equipment is provided by an explosion relief panel 60 placed in the back of the oven. The panel is nested within a cage and mounted with pressure release latches to form a tight seal. The caged panel serves to provide a pressure release while retaining the release panel and debris within the cage.

In accordance with the present invention there is provided a method and system for employing an automated pyrolysis-oxidation process in a high temperature cleaning oven. Preset timers and a temperature controller automatically direct the purge, pyrolysis, oxidation, and shutdown sequences of the cleaning process.

Safety of personnel and equipment is substantially improved by the incorporation of a combustible gas detector, a loss of inert gas detection system, a system for controlling the mixture of the oven atmosphere, a key interlock system, an overtemperature switch and an explosion relief panel into the system.

Having described the invention in connection with certain specific embodiments thereof, it is to be understood that further modifications may now suggest themselves to those skilled in the art and it is intended to cover such modifications as fall within the scope of the appended claims.

What is claimed is:

1. In an electrically heated, high temperature cleaning oven in which organic contaminants are pyrolyzed and the resulting residues are oxidized, the combination which comprises:
   a. a plurality of timers to automatically direct a cleaning operation;
   b. a start button connected to a power source to initialize one of said plurality of timers to direct the purging of said oven with inert gas;
   c. interlock means electrically connected to said start button for automatically locking an oven door when said oven is energized;
   d. temperature regulating means having a temperature probe within said oven for initiating a second of said plurality of timers to control the duration of pyrolysis, with a third of said plurality being responsive to an end of cycle pulse from said second of said plurality to direct the oxidation of contaminant residues;

e. a plurality of electrically controlled pneumatic valves interposed between said oven and sources of air and inert gas, and responsive to signals from said timers;

f. means responsive to signals from said temperature regulating means and from said one and said third of said plurality of timers for controlling electrical heaters within said oven;

g. automatic correcting means having a high temperature gas detector probe within said oven and electrically connected to said heater control means, to one of said plurality of valves controlling the flow of air from a pressurized air source into said oven, and to an alarm for signaling the presence of combustible gas and taking corrective action;

h. pressure sensing means connected between said oven and an inert gas source for signaling failure of said gas source;

i. means connected between said oven and said sources of pressurized air and inert gas for maintaining a preset air and inert gas mixture when air is admitted into said oven;

j. temperature control means having a temperature probe within said oven for deenergizing said heater control means in event of overheating or rapid temperature changes; and k. means forming a caged panel within a wall of said oven to relieve pressure while retaining debris in event gases within said oven ignite.

2. The combination set forth in claim 1 wherein said plurality of timers are three in number and emit signals at the beginning and at the end of their respective timing cycles.

3. The combination set forth in claim 1 wherein said inert gas is nitrogen.

4. The combination set forth in claim 3 wherein said mixture maintaining means is preset for a nitrogen-oxygen mixture with less than eight percent oxygen.

5. The combination set forth in claim 1 wherein said pressure sensing means is connected to a second of said plurality of valves to admit an auxiliary supply of inert gas when pressure of said primary source falls below preset levels.

6. The combination set forth in claim 5 wherein said pressure sensing means is connected to an alarm and to said heater control means.

7. The combination set forth in claim 1 wherein said mixture maintaining means includes a pressure regulator connected between said one of said plurality of valves and said pressurized air source, and a pressure regulator connected between a second of said plurality of valves and said inert gas source.

8. The combination set forth in claim 1 wherein said oven temperature control means includes ann auxiliary power relay connected to said heater control means.

* * * * *